Patented Apr. 14, 1925.

1,533,616

UNITED STATES PATENT OFFICE.

STANLEY D. SHIPLEY AND GUY C. GIVEN, OF STAMFORD, CONNECTICUT, ASSIGNORS TO ATLAS POWDER COMPANY, OF WILMINGTON, DELAWARE, A CORPORATION OF DELAWARE.

LACQUER AND LACQUER ENAMEL.

No Drawing. Application filed June 24, 1924. Serial No. 722,032.

*To all whom it may concern:*

Be it known that STANLEY D. SHIPLEY and GUY C. GIVEN, citizens of the United States, residing at Stamford, in the county of Fairfield and State of Connecticut, have invented certain new and useful Improvements in Lacquers and Lacquer Enamels, of which the following is a specification.

The object of our invention is to produce a new and novel composition of matter having useful properties as a lacquer or lacquer-enamel, among which may be mentioned the qualities of being cheap, free from precipitation, non-hygroscopic, free-flowing, and of pleasant odor.

In the nitrocellulose industries, such as in the manufacture of lacquers, and lacquer-enamels, there is a demand for a composition having all of the above-mentioned qualities. None of the ordinary nitrocellulose compositions having solvents such as glacial acetic acid, amyl acetate and acetone, including their homologues and derivatives, has all of these desirable properties. In these several industries, it is desirable to vary the relative proportions of the solvent and nitrocellulose to obtain a solution of the strength desired according to the nature of nitrocellulose film to be formed. For example, in lacquer work, the solution ordinarily does not contain over five ounces of nitrocellulose per gallon in order that a film of proper thickness may be deposited. In some of the decorative arts, a very heavy film is employed which can be deposited from a solution containing as high as twenty ounces of nitrocellulose per gallon. There is thus for each industry a strength of solution which is best adapted thereto. Where a solution is desired having less nitrocellulose than the total amount which the solvent is capable of taking up (for instance if a solution of twenty ounces of nitrocellulose to a gallon of solvent were desired, which is less than the total amount which the solvent would take up), it is unnecessary to have the entire quantity of solution composed of pure solvent, it only being necessary to have enough solvent present to dissolve the desired amount of nitrocellulose. For economy, therefore, it is customary to add cheap diluents to the solvents, which diluents are either entirely non-solvent or nearly so. The use of diluents, however, introduces difficulties, among which may be mentioned the following:—When, as used in factories, these solvents are evaporated at the ordinary room atmosphere in order to deposit a film of nitrocellulose, there is a tendency, except in the case of those solvents which are non-hygroscopic, but expensive, such as amyl acetate, toward a separation out of the nitrocellulose through absorption of moisture from the air or through the change in the composition of the solvent mixture resulting from the unequal rate of evaporation of its components, this precipitation being usually evidenced by the appearance of a whitish substance, technically known as "blushing" or "blooming", or by the settling to the bottom of a jelly like mass. Such separation tends to decrease the strength of the film, and in some cases, the white appearance produces objectionable color effects. Moreover, the odor of amyl acetate and the ordinarily used nitrocellulose-solvents is highly objectionable to most people.

We have discovered that by the use of a composition containing ethyl-glycol

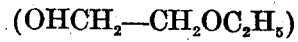

a chemical compound manufactured by introducing an ethyl group in place of one of the hydroxyl hydrogens in glycol

as the active nitrocellulose-solvent, and benzene as a non-solvent or diluent a mixture is obtained which has a maximum solvent power, and in which there is no tendency for the nitrocellulose to precipitate. Such a mixture is comparatively non-hygroscopic, When these materials are mixed together, the solvent power of the ethyl-glycol, is retained so that the mixture may contain as high as seventy-five per cent of benzene. We have discovered that ethyl-glycol is unique in respect that it withstands a greater dilution with a non-solvent for nitrocellulose than any other known material. Also that it retains its solvent-power when added to a mixture of non-solvents for nitrocellulose. We find that during evaporation under ordinary factory conditions, the mixture deposits a film which is strong and transparent. The low vapor pressure of the ethyl-glycol causes it to remain in the film until the last, which property causes the deposited film to be much smoother and freer from all pebbly defects than would be the case if the vapor pressure were higher. Ethyl-glycol being almost entirely free from odor, imparts no objectionable odor to the lacquer or lacquer-enamel, and moreover leaves no residual odor in the film. This is not the case with the ordinarily used nitrocellulose solvents, such as amyl acetate, etc. Lacquers and lacquer-enamels made with the ordinarily used nitrocellulose solvents cannot be used in lacquering or enameling the inside of refrigerators, for example, on account of the residual odor left in the film which persists for months or even years. A lacquer or lacquer-enamel made with ethyl-glycol may be used for this or analogous purposes.

We have discovered that other diluents or non-solvents for nitrocellulose can be used in our composition with equal facility in that the ethyl-glycol retains its enormous solvent power. Examples of the non-solvents that can be used are as follows: benzene hydrocarbons (benzene, toluene, xylene, etc.,) petroleum hydrocarbons (gasoline) acyclic alcohols, (ethyl alcohol, propyl alcohol, butyl alcohol, amyl alcohol, etc.)

We have discovered, moreover, that when a small amount—say ten per cent of ethyl-glycol is added to an ordinary nitrocellulose lacquer or lacquer-enamel made from the ordinarily used nitrocellulose solvents, such as amyl acetate or other acetic acid ester of an acyclic alcohol containing in addition to the nitrocellulose and solvents resin or resins, an oil or oils, a latent solvent, or latent solvents such as camphor, tricresylphosphate etc., with or without pigment, a much improved composition results. The ethyl-glycol imparts a free-flowing quality to the lacquer or lacquer-enamel which is not a quality possessed by the ordinarily manufactured lacquer or lacquer-enamel. The addition of even ten per cent of the ethyl-glycol to an ordinary lacquer or lacquer enamel made from the above mentioned constituents gives the lacquer or lacquer-enamel a flowing quality which makes it possible to apply the lacquer or lacquer-enamel with a brush, and obtain a smooth, even surface free from brush marks. An ordinarily manufactured lacquer or lacquer-enamel not containing ethyl-glycol must be applied with a spray in order to obtain an even surface.

Examples of our invention may be given as follows:

(a) *A lacquer.*

1 pound of nitrocellulose and one and one half pounds of glycerine-resin-ester (a resin) are dissolved in seven pounds of a mixture of the following composition.

| | Per cent. |
|---|---|
| Ethyl-glycol ($OHCH_2\text{-}CH_2OC_2H_5$) | 35 |
| Benzene | 10 |
| Toluene | 15 |
| Xylene | 10 |
| Gasoline | 10 |
| Butyl alcohol | 10 |
| Denatured ethyl alcohol | 10 |

(b) *A lacquer-enamel.*

Two pounds of zinc oxide (pigment) is ground into the above described lacquer, and two ounces of castor oil and two ounces of camphor (a latent solvent) are added.

The two above examples (a) and (b) are designed for use where the odors of the ordinarily used nitrocellulose solvents are objectionable.

Where odors are not objectionable, but where it is desired to obtain the free-flowing qualities which will permit the lacquer or lacquer-enamel to be applied with a brush, the following examples of our invention are given:

(a) *A lacquer.*

1 pound of nitrocellulose and one and one half pounds of glycerine-resin-ester (a resin) are dissolved in seven pounds of a mixture of the following composition.

| | Per cent. |
|---|---|
| Ethyl-glycol ($OHCH_2\text{-}CH_2OC_2H_5$) | 10 |
| Amyl acetate | 5 |
| Butyl acetate | 10 |
| Ethyl acetate | 15 |
| Benzene | 10 |
| Toluene | 10 |
| Xylene | 10 |
| Gasoline | 10 |
| Amyl alcohol | 5 |
| Butyl alcohol | 5 |
| Denatured ethyl alcohol | 10 |

(b) *A lacquer enamel.*

Two pounds of zinc oxide (a pigment) is ground into the above described lacquer, and two ounces of castor oil and two ounces of camphor (a latent solvent) are added.

We have given specific instances merely by way of illustration, and we are not to be confined to the exact constituents nor proportions given, as they are to be regarded as typical only.

We claim:
1. A composition comprising nitrocellulose and ethyl-glycol.
2. A composition comprising nitrocellulose, ethyl-glycol, and a non-solvent diluent miscible therewith without precipitation of the nitrocellulose.
3. A composition comprising nitrocellulose, ethyl-glycol and a hydrocarbon diluent miscible with the same without precipitation of the nitrocellulose.
4. A composition comprising nitrocellulose, ethyl-glycol and a mixture of diluents which are non-solvents of nitrocellulose but are miscible therewith without precipitation of the nitrocellulose.
5. A composition comprising nitrocellulose, ethyl-glycol and a benzene hydrocarbon.
6. A composition comprising nitrocellulose, ethyl-glycol, a benzene hydrocarbon and an acyclic alcohol.
7. A composition comprising nitrocellulose and a resin, in combination with ethyl-glycol and a diluent which is a non-solvent of nitrocellulose and is miscible with the said composition without precipitation of the nitrocellulose.
8. A composition comprising nitrocellulose and a resin, in combination with ethyl-glycol and a hydrocarbon diluent miscible with the said composition without precipitation of the nitrocellulose.
9. A composition comprising nitrocellulose and a resin, in combination with ethyl-glycol and a benzene hydrocarbon.
10. A composition comprising nitrocellulose and a resin as a base, ethyl-glycol, a benzene hydrocarbon, an acyclic alcohol and an acetate ester of an acyclic alcohol.
11. A composition comprising nitrocellulose and a resin as a base, ethyl-glycol, a diluent which is non-solvent of nitrocellulose, miscible with the composition without precipitation of the nitrocellulose and a pigment.
12. A nitrocellulose solvent mixture, the essential constituent of which is ethyl-glycol ($OHCH_2CH_2OC_2H_5$).
13. A nitrocellulose solvent comprising a mixture of ethyl-glycol and a non-solvent of nitrocellulose miscible as a diluent with said mixture.
14. A nitrocellulose solvent comprising a mixture of ethyl-glycol and a hydrocarbon miscible as a diluent with said mixture.
15. A nitrocellulose solvent comprising a mixture of ethyl-glycol, an acyclic alcohol and a hydrocarbon miscible as a diluent with said mixture.
16. A nitrocellulose solvent comprising a mixture of ethyl-glycol and a benzene hydrocarbon.
17. A nitrocellulose solvent comprising a mixture of ethyl-glycol, an acetic acid ester of an acyclic alcohol and a benzene hydrocarbon.
18. A nitrocellulose solvent comprising a mixture of ethyl-glycol and benzene.
19. A nitrocellulose solvent comprising a mixture of ethyl-glycol, benzene, ethyl acetate and ethyl alcohol.
20. A nitrocellulose solvent comprising a mixture of ethyl-glycol, benzene, toluene, xylene, ethyl acetate, butyl acetate, ethyl alcohol and butyl alcohol.
21. The process of forming a body of nitrocellulose which comprises dissolving nitrocellulose in a solvent consisting essentially of ethyl-glycol ($OHCH_2CH_2OC_2H_5$) and evaporating said mixture.
22. The process of forming a body of nitrocellulose comprising dissolving nitrocellulose in a mixture of ethyl-glycol and a non-solvent for nitrocellulose and causing the said mixture to evaporate.
23. The process of forming a body of nitrocellulose comprising dissolving a resin and nitrocellulose in a mixture of ethyl-glycol and a non-solvent for nitrocellulose, incorporating a pigment, and causing the solvent mixture to evaporate.
24. The process of forming a body of nitrocellulose comprising dissolving a resin and nitrocellulose in a mixture of ethyl-glycol and a non-solvent for nitrocellulose and an acetic acid ester of an acyclic alcohol, incorporating a pigment and causing the said mixture to evaporate.

In testimony whereof they affix their signatures in the presence of two witnesses.

STANLEY D. SHIPLEY.
GUY C. GIVEN.

Witnesses:
M. E. SALLENGER,
C. D. FOREST.

DISCLAIMER.

1,533,616.—*Stanley D. Shipley* and *Guy C. Given*, Stamford, Conn. LACQUER AND LACQUER ENAMEL. Patent dated April 14, 1925. Disclaimer filed February 24, 1927, by the assignee, *Atlas Powder Company*.

Hereby enters this, its disclaimer, to the subject matter of claims 1, 2, 3, 5, 12, 13, 14, 16, 18, 21, and 22 of said patent, said claims being as follows:

" 1. A composition comprising nitrocellulose and ethyl-glycol.

" 2. A composition comprising nitrocellulose, ethyl-glycol, and a nonsolvent diluent miscible therewith without precipitation of the nitrocellulose.

" 3. A composition comprising nitrocellulose, ethyl-glycol and a hydrocarbon diluent miscible with the same without precipitation of the nitrocellulose.

" 5. A composition comprising nitrocellulose, ethyl-glycol and a benzene hydrocarbon.

" 12. A nitrocellulose solvent mixture, the essential constituent of which is ethyl-glycol ($OHCH_2CH_2OC_2H_5$).

" 13. A nitrocellulose solvent comprising a mixture of ethyl-glycol and a nonsolvent of nitrocellulose miscible as a diluent with said mixture.

" 14. A nitrocellulose solvent comprising a mixture of ethyl-glycol and a hydrocarbon miscible as a diluent with said mixture.

" 16. A nitrocellulose solvent comprising a mixture of ethyl-glycol and a benzene hydrocarbon.

" 18. A nitrocellulose solvent comprising a mixture of ethyl-glycol and benzene.

" 21. The process of forming a body of nitrocellulose which comprises dissolving nitrocellulose in a solvent consisting essentially of ethyl-glycol ($OHCH_2CH_2OC_2H_5$) and evaporating said mixture.

" 22. The process of forming a body of nitrocellulose comprising dissolving nitrocellulose in a mixture of ethyl-glycol and a nonsolvent for nitrocellulose and causing the said mixture to evaporate."

*[Official Gazette March 15, 1927.]*